(12) United States Patent
Kim et al.

(10) Patent No.: US 12,095,114 B2
(45) Date of Patent: Sep. 17, 2024

(54) COMPOSITE MEMBRANE AND MANUFACTURING METHOD THEREFOR

(71) Applicants: W-SCOPE KOREA CO., LTD., Cheongju-si (KR); W-SCOPE CHUNGJU PLANT CO., LTD., Chungju-si (KR)

(72) Inventors: Byung Hyun Kim, Yongin-si (KR); Pyung Yong Park, Cheongju-si (KR); Hee Min Cho, Cheongju-si (KR)

(73) Assignees: W-SCOPE KOREA CO., LTD., Cheongju-si (KR); W-SCOPE CHUNGJU PLANT CO., LTD., Chungju-si (KR)

( * ) Notice: Subject to any disclaimer, the term of this patent is extended or adjusted under 35 U.S.C. 154(b) by 716 days.

(21) Appl. No.: 17/263,431

(22) PCT Filed: Sep. 11, 2018

(86) PCT No.: PCT/KR2018/010644
§ 371 (c)(1),
(2) Date: Jan. 26, 2021

(87) PCT Pub. No.: WO2020/036252
PCT Pub. Date: Feb. 2, 2020

(65) Prior Publication Data
US 2022/0173480 A1    Jun. 2, 2022

(30) Foreign Application Priority Data
Aug. 17, 2018    (KR) .................. 10-2018-0095869

(51) Int. Cl.
*H01M 50/446* (2021.01)
*H01M 10/0562* (2010.01)
(Continued)

(52) U.S. Cl.
CPC ..... *H01M 50/446* (2021.01); *H01M 10/0562* (2013.01); *H01M 50/403* (2021.01);
(Continued)

(58) Field of Classification Search
None
See application file for complete search history.

(56) References Cited

U.S. PATENT DOCUMENTS

| 6,096,234 A * | 8/2000 | Nakanishi | H01M 10/052 525/941 |
| 11,848,434 B1 * | 12/2023 | Sharafi | H01M 50/242 |

(Continued)

FOREIGN PATENT DOCUMENTS

| CN | 106654362 A | 5/2017 |
| CN | 106784528 A | 5/2017 |

(Continued)

OTHER PUBLICATIONS

Jung et al. (All Solid-State Lithium Batteries Assembled with Hybrid Solid Electrolytes, Journal of The Electrochemical Society, 162 (4) A704-A710 (2015) (Year: 2015).*

(Continued)

*Primary Examiner* — Scott J. Chmielecki
(74) *Attorney, Agent, or Firm* — NKL Law; Jae Youn Kim (57) ABSTRACT

In one embodiment of the present invention, provided are: a composite membrane comprising a polyolefin-based porous support and a solid electrolyte impregnated into the support; and a manufacturing method therefor.

10 Claims, 2 Drawing Sheets

---

(a) MIX INORGANIC ELECTROLYTE AND GEL ELECTROLYTE

(b) FILL POROUS SUPPORT

(51) Int. Cl.
*H01M 50/403* (2021.01)
*H01M 50/417* (2021.01)
*H01M 50/443* (2021.01)
*H01M 50/489* (2021.01)
*H01M 50/491* (2021.01)
*H01M 50/494* (2021.01)

(52) U.S. Cl.
CPC ....... *H01M 50/417* (2021.01); *H01M 50/443* (2021.01); *H01M 50/489* (2021.01); *H01M 50/491* (2021.01); *H01M 50/494* (2021.01); *H01M 2300/0068* (2013.01)

(56) References Cited

U.S. PATENT DOCUMENTS

| | | | | |
|---|---|---|---|---|
| 2006/0275636 A1* | 12/2006 | Yang | ................... | C07F 9/3856 |
| | | | | 568/14 |
| 2009/0189567 A1* | 7/2009 | Joshi | ................... | H01M 10/39 |
| | | | | 320/137 |
| 2011/0206974 A1* | 8/2011 | Inoue | ................... | H01M 4/667 |
| | | | | 156/60 |
| 2012/0235644 A1* | 9/2012 | Gordon | ................ | H01M 10/36 |
| | | | | 429/105 |
| 2013/0026409 A1* | 1/2013 | Baker | ................... | H01G 11/64 |
| | | | | 429/479 |
| 2015/0005405 A1* | 1/2015 | Ishihara | ................. | C08L 23/06 |
| | | | | 521/134 |
| 2015/0072236 A1* | 3/2015 | Um | ..................... | H01M 4/1395 |
| | | | | 429/231.95 |
| 2019/0267687 A1* | 8/2019 | Suzuki | ................. | H01M 12/02 |
| 2020/0112050 A1* | 4/2020 | Hu | .................... | H01M 10/0525 |
| 2020/0203762 A1* | 6/2020 | Park | .................... | H01M 50/491 |

FOREIGN PATENT DOCUMENTS

| | | |
|---|---|---|
| CN | 107403954 A | 11/2017 |
| JP | 2005-216667 A | 8/2005 |
| JP | 3919346 B2 | 5/2007 |
| KR | 10-1389022 B1 | 4/2014 |
| KR | 10-1512170 B1 | 4/2015 |
| KR | 10-2016-0129762 A | 11/2016 |
| KR | 10-1747938 B1 | 6/2017 |

OTHER PUBLICATIONS

Jung et al., "All Solid-State Lithium Batteries Assembled with Hybrid Solid Electrolytes", Journal of The Electrochemical Society, 2015, pages A704-A710, vol. 162 (4).

\* cited by examiner

COMPOSITE MEMBRANE AND MANUFACTURING METHOD THEREFOR

TECHNICAL FIELD

The present invention relates to a composite membrane and a manufacturing method thereof, and more specifically, to a composite membrane including a solid electrolyte, which is usable as a battery separator, and a manufacturing method thereof.

BACKGROUND ART

Lithium secondary batteries have higher energy density and longer operational lifespans than those of other batteries, so they have been widely used in the fields that require small-sized secondary batteries such as smartphones and laptop computers to the fields that require medium-to-large-sized secondary batteries such as electric vehicles and energy storage systems (ESSs).

Conventional lithium secondary batteries use a liquid electrolyte, and the liquid electrolyte exhibits excellent ion conductivity but has a problem of poor stability due to the risk of ignition, explosion, and the like caused by physical impact or high temperature. In particular, to apply this electrolyte to electric vehicles and ESSs using a large amount of lithium secondary batteries, there is a need to further improve stability.

In order to solve the problem, academic research on a next-generation lithium secondary battery using a solid electrolyte has been actively conducted. As a representative solid electrolyte, there is a NASICON-type inorganic electrolyte, and the NASICON-type inorganic electrolyte is characterized by having the composition $LiM_2(PO_4)_3$. However, the NASICON-type solid electrolyte has poor ion conductivity compared to a liquid electrolyte and a high manufacturing cost due to a complex manufacturing method thereof and also makes it difficult to manufacture a large-capacity battery by increasing the interfacial resistance between the electrolyte and electrodes in the manufacture of a battery cell due to having hardness and brittleness.

As another example of the solid electrolyte, there is a gel-type electrolyte prepared by combining a polyethylene oxide-based polymer and a lithium salt. However, the gel-type electrolyte has drawbacks of poor physical strength, poor heat resistance due to a low melting point of the polymer, and degradation of ion conductivity at room temperature and high temperature due to a crystallization tendency and ion migration resistance.

Related-Art Documents (Non-Patent Document 1) Yun-Chae Jung et al., All Solid-State Lithium Batteries Assembled with Hybrid Solid Electrolytes, *Journal of The Electrochemical Society*, 162 (4), A704-A710. (2015)

DISCLOSURE

Technical Problem

The present invention is directed to providing a composite membrane including a solid electrolyte impregnated into a polyolefin-based porous support, which is usable in a next-generation battery.

Technical Solution

One aspect of the present invention provides a composite membrane which includes: a polyolefin-based porous support; and a solid electrolyte impregnated into the support.

In an exemplary embodiment, the solid electrolyte may be impregnated into at least a portion of micropores in the polyolefin-based porous support.

In an exemplary embodiment, a surface of the support may be at least partially coated with the solid electrolyte.

In an exemplary embodiment, the support may include two types of polyethylene having different weight-average molecular weights at 30 to 90 wt % and an inorganic filler at 10 to 70 wt %.

In an exemplary embodiment, the polyethylene may include first polyethylene having a weight-average molecular weight of 1,000,000 to 3,000,000 and second polyethylene having a weight-average molecular weight of 200,000 to 500,000.

In an exemplary embodiment, the support may have a porosity of 50 to 90% and an average pore size of 20 to 100 nm.

In an exemplary embodiment, the solid electrolyte may include a lithium salt, an inorganic electrolyte, and a polymer.

In an exemplary embodiment, the inorganic electrolyte may be a compound represented by the following Chemical Formula 1 or 2:

[Chemical Formula 1]

[Chemical Formula 2]

in Chemical Formula 1 or 2, $0 \leq x \leq 2$.

In an exemplary embodiment, the polymer may be one selected from the group consisting of an oxide-based polymer, a nitrile-based polymer, a fluorine-based polymer, an acrylic polymer, a sulfone-based polymer, and a copolymer of two or more thereof.

In an exemplary embodiment, the composite membrane may have a thickness of 5 to 100 μm, a tensile strength of 500 to 2,500 kgf/cm², a tensile elongation of 50 to 300%, and a puncture strength of 100 to 600 gf.

Another aspect of the present invention provides a method of manufacturing a composite membrane, which includes the steps of: (a) mixing a lithium salt, an inorganic electrolyte, and a polymer in a solvent to prepare an electrolyte solution; and (b) filling pores of a porous support with the electrolyte solution.

In an exemplary embodiment, a weight ratio of the inorganic electrolyte and the polymer may be 6 to 8:2 to 4.

Advantageous Effects

According to one aspect of the present invention, a composite membrane including a solid electrolyte can be provided.

According to another aspect of the present invention, a composite membrane having excellent physical strength and excellent ion conductivity compared to a conventional NASICON-type electrolyte membrane or gel-type electrolyte membrane can be provided.

According to still another aspect of the present invention, a composite membrane, which is easily thinned compared to a conventional electrolyte membrane and thus facilitates a large-capacity and large-area battery, can be provided.

However, it is to be understood that the effects of the present invention are not limited to the above-described effects but include all effects deducible from the configuration of the present invention described in the detailed description of the present invention or in the claims.

MODES OF THE INVENTION

Hereinafter, the present invention will be described with reference to accompanying drawings. However, it should be understood that the present invention can be implemented in various forms, and that it is not intended to limit the present invention to exemplary embodiments presented herein. Also, in the drawings, descriptions of parts unrelated to the detailed description are omitted to clearly describe the present invention. Throughout the specification, like numbers refer to like elements.

Throughout the specification, a certain part being "connected" to another part means that the certain part is "directly connected" to the other part or that the certain part is "indirectly connected" to the other part through another member interposed between the two parts. Also, a certain part "including" a certain element signifies that the certain part may further include, instead of excluding, another element unless particularly indicated otherwise.

Hereinafter, exemplary embodiments of the present invention will be described in detail with reference to the accompanying drawings.

In general, an "electrolyte" is a substance that has conductivity when dissolved in a polar solvent and thus dissociated into ions. The electrolyte is an essential component in the manufacture of a battery, and a substance having excellent ion conductivity while limiting the transfer of electrons needs to be used as the electrolyte. Conventionally, a carbonate-based liquid electrolyte was mainly used, but there is a safety problem in that the electrolyte is vulnerable to evaporation, leakage, ignition, and explosion.

A "solid electrolyte" is a substance that facilitates ion migration in a solid state and does not have the above-described safety problem despite having poor ion conductivity compared to the liquid electrolyte. Therefore, the solid electrolyte is an essential component in the development of a next-generation battery.

A composite membrane according to an aspect of the present invention includes: a polyolefin-based porous support; and a solid electrolyte impregnated into the support. Furthermore, a surface of the support may be at least partially coated with the solid electrolyte.

The solid electrolyte may be impregnated into at least a portion of micropores in the polyolefin-based porous support.

When a battery is manufactured using the composite membrane of the present invention, the solid electrolyte impregnated into the support may be in contact with one electrode included in the battery and thus allow ions to migrate to the other electrode. In addition, when a surface of the support is at least partially coated with the solid electrolyte, a contact area of the solid electrolyte with an electrode increases, and thus the above-described ion migration may be promoted. Therefore, as an area of the surface coated with the solid electrolyte increases, the performance of the manufactured battery may be improved.

The support may include two types of polyethylene having different weight-average molecular weights at 30 to 90 wt % and an inorganic filler at 10 to 70 wt %. The polyethylene may include first polyethylene having a weight-average molecular weight of 1,000,000 to 3,000,000 and a molecular weight distribution of 3 to 4 and second polyethylene having a weight-average molecular weight of 200,000 to 500,000 and a molecular weight distribution of 4 to 7. For example, the polyethylene may include the first polyethylene at 30 to 70 wt % and the second polyethylene at 30 to 70 wt %.

Generally, as a molecular weight distribution ($M_w/M_n$) is wider, shear stress is decreased, and thus viscosity is decreased. As a result, processability is improved, but physical properties are degraded. On the other hand, as a molecular weight distribution is narrower, processability is degraded, but physical properties are improved. As described above, even when a mixture of at least two types of polymers is used in the form of a composition, the use of polymers having mutually similar molecular weight distributions does not harmoniously achieve physical properties and processability. Therefore, as described above, when the first polyethylene and the second polyethylene having different weight-average molecular weights and different molecular weight distributions are used together, the physical properties and processability of the porous support can be more harmoniously achieved.

The inorganic filler may be one selected from the group consisting of silica ($SiO_2$), $TiO_2$, $Al_2O_3$, zeolite, AlOOH, $BaTiO_2$, talc, $Al(OH)_3$, $CaCO_3$, and a mixture of two or more thereof and preferably is a spherical nanoparticle having an average particle size of 10 to 1,000 nm, and more preferably, a nanoparticle whose surface has been subjected to hydrophobization or hydrophilization. An amount of the inorganic filler included in the porous support may be 10 to 70 wt %, and preferably, 10 to 60 wt %. When the content of the inorganic filler is less than 10 wt %, the mechanical strength, acid resistance, chemical resistance, and flame retardancy of the porous support may be degraded, and when the content of the inorganic filler is more than 70 wt %, the flexibility and processability of the porous support may be degraded. When the inorganic filler is included in the support, a support exhibiting excellent mechanical strength while having high porosity may be prepared.

For example, silica ($SiO_2$) may have a hydrocarbon layer formed on the surface thereof, and the hydrocarbon layer consists of hydrophobic linear hydrocarbon molecules. Since silica itself has hydrophilicity, linear hydrocarbon molecules, for example, (poly)ethylene-coated spherical silica nanoparticles, are suitable for improving compatibility with polyethylene having hydrophobicity.

The support may have a porosity of 50 to 90%, and preferably, 70 to 80%, and an average pore size of 20 to 100 nm.

When the porosity of the support is less than 50%, the amount of an impregnated solid electrolyte is decreased, and thus ion conductivity may be degraded. On the other hand, when the porosity of the support is more than 90%, the mechanical strength of the composite membrane may be degraded. In particular, since the solid electrolyte has poor ion conductivity compared to the conventional liquid electrolyte, it is necessary to use a support having a high porosity of 60% or more.

When the average pore size of the support is less than 20 nm, it may be difficult to impregnate the solid electrolyte into the support, and when the average pore size of the support is more than 100 nm, the mechanical strength of the manufactured composite membrane may be poor.

The solid electrolyte may include a lithium salt, an inorganic electrolyte, and a polymer. The inorganic electrolyte may be a compound represented by the following Chemical Formula 1 or 2.

$$Li_{1+x}Al_xGe_{2-x}(PO_4)_3 \quad \text{[Chemical Formula 1]}$$

$$Li_{1+x}Al_xTi_{2-x}(PO_4)_3 \quad \text{[Chemical Formula 2]}$$

In Chemical Formula 1 or 2, $0 \leq x \leq 2$.

A "sodium (Na) Super Ionic CONductor (NASICON)" is an inorganic compound represented by the chemical formula $Na_{1+x}Zr_2Si_xP_{3-x}O_{12}$ (0<x<3) and has a high ion conductivity of about $10^{-3}$ S/cm, which is a similar level to that of a liquid electrolyte. It is known that this is because Na+ ions are able to hop between sites in the unique crystal lattice structure of the NASICON.

A NASICON-type inorganic electrolyte is an inorganic compound having a crystal lattice structure similar to that of NASICON, and as one example, LAGP may have high ion conductivity because $Li^+$ ions easily migrate.

The inorganic electrolyte may be LAGP or LATP which is a NASICON-type inorganic electrolyte.

A "gel electrolyte" is a type of solid electrolyte and prepared by impregnating a liquid into a flexible lattice framework and thus has properties similar to those of a liquid electrolyte. For example, the gel electrolyte is prepared by impregnating a liquid containing a lithium salt such as lithium perchlorate or the like into a lattice framework consisting of a polymer such as polyethylene oxide, polypropylene oxide, polyacrylonitrile (PAN), polyvinylidene fluoride (PVdF), polymethyl methacrylate, polyethersulfone, or the like.

The lithium salt may be one selected from the group consisting of lithium perchlorate, lithium tetrafluoroborate, lithium hexafluorophosphate, lithium hexafluoroantimonate, lithium hexafluoroarsenate, lithium triflate, and a mixture of two or more thereof, but the present invention is not limited thereto.

The polymer may be one selected from the group consisting of an oxide-based polymer, a nitrile-based polymer, a fluorine-based polymer, an acrylic polymer, a sulfone-based polymer, and a copolymer of two or more thereof. The lithium salt and the polymer may be combined to obtain a gel electrolyte.

The oxide-based polymer may be polyethylene oxide, polypropylene oxide, or a polymer whose side chain has an oxide group, the nitrile-based polymer may be polyacrylonitrile or a polymer whose side chain has a nitrile group, the fluorine-based polymer may be polyvinylidene fluoride, polytetrafluoroethylene, or a polymer whose side chain has fluoride, the acrylic polymer may be polymethyl methacrylate or a polymer whose side chain has an acrylic group, and the sulfone-based polymer may be a polymer whose main chain or side chain has a sulfone group, but the present invention is not limited thereto.

As described above, in the present invention, a mixture of the inorganic electrolyte and the gel electrolyte may be used to mutually compensate for the drawbacks of each electrolyte. For example, the addition of the gel electrolyte allows interfacial resistance between the electrolyte and electrodes and an increase in manufacturing costs, which are the drawbacks of the inorganic electrolyte, to be suppressed, and thus it may be favorable for manufacturing a large-capacity battery.

The solid electrolyte may include an additive capable of increasing ion conductivity, for example, boron trioxide ($B_2O_3$), at 0.01 to 0.1 wt % based on 100 wt % of the solid electrolyte. The additive may lower the crystallization temperature of LAGP to increase ion conductivity and improve stability even in a solution.

In the related art, a film-type membrane was manufactured by forming a solid electrolyte coating, but this type of composite membrane has a limitation in reducing a film thickness to a certain level or less due to having poor mechanical strength compared to an existing membrane, and thus the use thereof is substantially impossible. However, in the present invention, the solid electrolyte prepared by mixing the inorganic electrolyte and the gel electrolyte may be impregnated into the porous support to manufacture a composite membrane having excellent mechanical strength. The composite membrane may have a thickness of 5 to 100 μm, a tensile strength of 500 to 2,500 kgf/cm², a tensile elongation of 50 to 300%, and a puncture strength of 100 to 600 gf.

Figure 1:
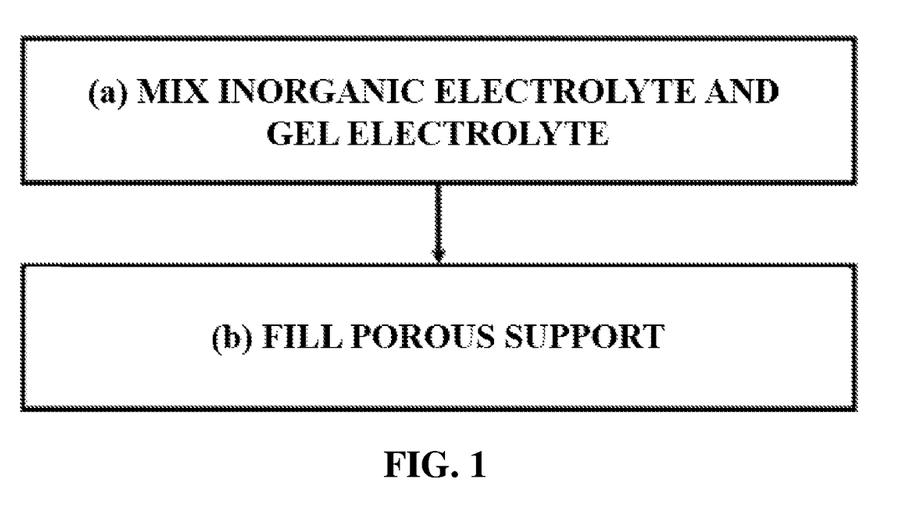
FIG. 1 is a flow chart of a method of manufacturing a composite membrane including a solid electrolyte and a porous support according to an embodiment of the present invention.

Referring to FIG. 1, a method of manufacturing a composite membrane according to another aspect of the present invention includes the steps of: (a) mixing a lithium salt, an inorganic electrolyte, and a polymer in a solvent to prepare an electrolyte solution; and (b) filling pores of a porous support with the electrolyte solution.

In the step (a), an electrolyte solution may be prepared by preparing the inorganic electrolyte in powder form, adding the inorganic electrolyte powder to a solution containing the lithium salt and the polymer, and dispersing the same therein. The dispersion may be performed by a bead mill, a mixer, or the like, which uses a direct grinding method. The bead mill, which is a general term for an apparatus using beads as grinding media, may be classified into a ball mill, an attrition mill, a vertical mill (disk type, pin type), a horizontal mill (disk type, pin type, high energy mill), a paint shaker, and the like. Among them, representatively, the ball mill is a rotary mill using ball-shaped grinding media, and the attrition mill is an apparatus for performing grinding using the frictional force of a roller. Meanwhile, examples of the mixer may include a three-roll mill, a planetary mixer, a paste mixer, and the like. As such a direct grinding method, a wet method is mainly used, but the present invention is not limited thereto.

The inorganic electrolyte may be prepared by the steps of: (i) mixing a lithium salt, an aluminum salt, a phosphate-based compound, and a germanium or titanium salt to prepare a solid solution; (ii) adding an additive to the solid solution and dispersing the resulting solution in a solvent; and (iii) calcining a product of the step (ii).

As the solvent used in the step (a), for example, anhydrous acetonitrile may be used. An amount of the solvent is sufficient as long as it allows the lithium salt, the inorganic electrolyte, and the polymer to be sufficiently dissolved, and when an excessive amount of the solvent is used, a drying process that may be performed after the step (b) may require a significant amount of time.

A weight ratio of the inorganic electrolyte and the polymer may be 6 to 8:2 to 4, and a weight ratio of the polymer and the lithium salt may be 15 to 20:1.

In the step (b), various configurations may be added so that the pores of a porous support are sufficiently filled with the electrolyte solution. The filling may be performed by applying the electrolyte solution onto at least one surface of the porous support by a method such as dipping, roll coating, bar coating, and spray coating. In addition, a viscosity decreasing agent may be added to the electrolyte solution, or the amount of the solvent may be increased. Alternatively, when dipping is performed at high temperatures, the electrolyte solution may be more easily impregnated.

As another method, both surfaces of the porous support may be provided with a pressure gradient to increase the amount of the electrolyte solution impregnated during the step (b). In particular, when the filling is performed by roll coating, a suction apparatus or a roll including the suction apparatus may be positioned at a surface opposite to a surface onto which the electrolyte solution is applied so that the pores of the porous support are smoothly and rapidly filled with the electrolyte solution applied onto one surface of the porous support. If necessary, a portion of the electrolyte solution applied onto one surface of the porous support may not be filled in the pores of the porous support but completely pass through the pores, and thus may be collected in the suction apparatus, and in this case, the collected electrolyte solution may be reused to increase productivity.

As still another method, when the inside of pores of the porous support and/or the surface of the porous support is coated with a polar substance, the wettability of the electrolyte solution is improved, and thus the pores of the porous support may be more easily filled with the electrolyte solution. The above-described methods may be used alone or in combination thereof.

Hereinafter, exemplary embodiments of the present invention will be described in more detail. However, hereinafter, only experimental results obtained from a few selected exemplary embodiments of the present invention will be described, and the scope and contents of the present invention should not be interpreted as being reduced or limited by the few selected exemplary embodiments. The effects of each of the various embodiments of the present invention which are not explicitly set forth below will be described in detail in relevant sections.

Examples 1 to 5

20 parts by weight of ethylene-coated silica nanoparticles having an average particle size of 600 nm, 60 to 100 parts by weight of liquid paraffin oil having a kinematic viscosity of 70 cSt (@ 40° C.), 20 parts by weight of first polyethylene having a weight-average molecular weight of 1,500,000, 20 parts by weight of second polyethylene having a weight-average molecular weight of 350,000, and 1 part by weight of phosphite ester as an antioxidant were mixed, and the silica nanoparticles were dispersed using a high-speed mixer.

Afterward, microbubbles generated in the mixing process were removed by a vacuum deaeration process. Melt kneading and discharging were performed at 190 to 230° C. using a twin-screw extruder equipped with a T-die having a width of 350 mm. In this case, an input amount was controlled so that nanosilica was included at 51.4 wt % in a porous support. The melt kneading product extruded by the T-die was allowed to pass through a cast roll set at 60° C. and then solidified by cooling to room temperature, and the resulting sheet was adjusted to have a thickness of 1 to 2 mm.

Subsequently, the extruded porous support was stretched 600 to 1,000% in the transverse direction and 600 to 1,000% in the machine direction using a biaxial stretching machine heated to 120° C. to prepare a film. The prepared film was immersed in 40° C. methylene chloride for one hour to remove the liquid paraffin oil and then dried at room temperature to remove a residual solvent. Afterward, the resulting film was stretched 10% and shrunk 5% in the transverse direction and then stretched 10% and shrunk 5% in the machine direction using a biaxial stretching machine, and then was thermoset for 30 seconds, thereby preparing a porous support having a porosity of 50 to 90% and an average pore size of 20 to 100 nm.

Lithium carbonate ($Li_2CO_3$), aluminum oxide ($Al_2O_3$), germanium oxide ($GeO_2$), and ammonium dihydrogen phosphate ($NH_4H_2PO_4$) were mixed at an appropriate ratio to prepare a $Li_{1.5}Al_{0.5}Ge_{1.5}(PO_4)_3$ (LAGP) solid solution. $B_2O_3$ was added at 0.05 wt % based on the total weight of the solid solution, and the resulting solid solution was dispersed in isopropyl alcohol by ball milling for 24 hours. A volatile solvent was evaporated by drying at 25° C. for 24 hours, a residual volatile substance was further removed for 2 hours by heating to 700° C. at a rate of 5° C./min, and then the resulting product was heated to 850° C. at a rate of 5° C./min and calcined under argon for 12 hours to prepare LAGP powder.

Polyethylene oxide (PEO) having a weight-average molecular weight of 150,000 and lithium perchlorate ($LiClO_4$) were vacuum-dried at 100° C. for 24 hours, then dissolved in anhydrous acetonitrile, and stirred at 80° C. for 12 hours. The LAGP powder was added thereto, and then ball milling was performed for 24 hours to prepare an electrolyte solution. A weight ratio of LAGP and PEO in the electrolyte solution was 6 to 8:2 to 4, and a molar ratio of the ethylene oxide group and lithium ion was 15 to 20:1.

The porous support was immersed in the electrolyte solution to sufficiently impregnate the electrolyte into pores of the support. Then, the resulting porous support was washed and dried at room temperature to obtain a composite membrane.

In the case of Examples 1 to 3, composite membranes were manufactured by impregnating porous supports having different porosities with an electrolyte solution including LAGP and PEO in a weight ratio of 7:3, and in the case of Examples 4 and 5, composite membranes were manufactured by using a porous support having a porosity of 75% and varying a weight ratio of LAGP and PEO.

Comparative Example 1

The electrolyte solution including LAGP and PEO in a weight ratio of 7:3 according to the examples was applied onto a flat plate by a doctor blade coating method and then dried under vacuum at 40° C. to remove a solvent, thereby obtaining a composite membrane.

Comparative Examples 2 and 3

Composite membranes were manufactured by using a porous support having a porosity of 75%, which was prepared in the same manner as in the examples, and varying a weight ratio of LAGP and PEO.

Comparative Example 4

60 to 100 parts by weight of liquid paraffin oil having a kinematic viscosity of 70 cSt (@ 40° C.), 20 parts by weight of first polyethylene having a weight-average molecular weight of 1,500,000, 20 parts by weight of second polyethylene having a weight-average molecular weight of 350,000, and 1 part by weight of phosphite ester as an antioxidant were mixed.

Afterward, microbubbles generated in the mixing process were removed by a vacuum deaeration process. Melt kneading and discharging were performed at 190 to 230° C. using a twin-screw extruder equipped with a T-die having a width of 350 mm. The melt kneading product extruded by the T-die was allowed to pass through a cast roll set at 60° C. and then solidified by cooling to room temperature, and the resulting sheet was adjusted to have a thickness of 1 to 2 mm.

Subsequently, the extruded porous support was stretched 600 to 1,000% in the transverse direction and 600 to 1,000% in the machine direction using a biaxial stretching machine heated to 120° C. to prepare a film. The prepared film was immersed in 40° C. methylene chloride for one hour to remove the liquid paraffin oil and then dried at room temperature to remove a residual solvent. Afterward, the resulting film was stretched 10% and shrunk 5% in the transverse direction and then stretched 10% and shrunk 5% in the machine direction using a biaxial stretching machine, and then was thermoset for 30 seconds, thereby preparing a support. However, the prepared support was unable to be used due to having a porosity of less than 60% and an average pore size of less than 20 nm due to occurrence of shrinkage, or being fractured during stretching.

Preparation Example

The composite membrane of Example 2 was interposed between two copper foil electrodes to form a jelly roll-type assembly, nickel tabs were connected to tabs of the electrodes, and the assembly was sealed with an aluminum (Al) pouch to manufacture a battery cell.

Comparative Preparation Example 1

A battery cell was manufactured in the same manner as in the preparation example except that the composite membrane of Comparative Example 1 was used instead of the composite membrane of Example 2.

Comparative Preparation Example 2

A porous support having a porosity of 75%, which was prepared in the same manner as in the examples, was interposed between two copper foil electrodes to form a jelly roll-type assembly, nickel tabs were connected to tabs of the electrodes, an electrolyte was injected thereto, and then the resulting assembly was sealed with an Al pouch to manufacture a battery cell. As the electrolyte, 0.85 g of an electrolyte containing 1.15M $LiPF_6$ and ethyl carbonate (EC) and ethyl methyl carbonate (EMC) (EC:EMC volume ratio of 3:7) was used.

Experimental Example 1

The test method for each of the material properties measured in the present invention is as follows. If there is no separate mention of the temperature, measurement was performed at room temperature (25° C.).

Thickness (μm): The thickness of a support or composite membrane specimen was measured using a precision thickness gauge.

Porosity (%): The porosity of a support specimen having a radius of 25 mm was measured in accordance with ASTM F316-03 using a capillary porometer commercially available from Porous Materials INC.

Tensile strength ($kgf/cm^2$): The stress applied in the transverse direction (TD) to a composite membrane specimen having a size of 20 mm×200 mm until the specimen fractured was measured using a tensile strength tester.

Tensile elongation (%): The maximum length of a composite membrane specimen having a size of 20 mm×200 mm elongated when the stress was applied in the TD to the specimen until the specimen fractured was measured using a tensile strength tester, and the result was substituted into the following formula to calculate tensile elongation.

Tensile elongation (%)=$\{(I_1-I_2)/(I_1)\}*100$

Puncture strength (gf): A load was applied to a composite membrane specimen having a size of 100 mm×50 mm at a rate of 0.05 cm/sec using a stick having a diameter of 0.5 mm, and the load applied at the time the specimen was perforated was measured using a KES-G5 puncture strength tester commercially available from Kato Tech Co., Ltd.

Thermal shrinkage ratio (%): A composite membrane specimen having a size of 200 mm×200 mm was maintained in an oven set at 105° C. for one hour while being sandwiched between A4-sized paper sheets and then was cooled at room temperature. The lengths in the transverse and machine directions of the shrunk specimen were measured, and the results were substituted into the following formula to calculate a thermal shrinkage ratio. The higher value among thermal shrinkage ratios in the transverse and machine directions was described.

Thermal shrinkage ratio (%)=$\{(I_3-I_4)/(I_3)\}*100$ (in the formula, $I_3$ is the length in the transverse or machine direction of the specimen before shrinkage, and $I_4$ is the length in the transverse or machine direction of the specimen after shrinkage)

Ion conductivity (mS/cm): The ion conductivity of the battery cells manufactured in the preparation example or comparative preparation examples was measured five times at a frequency of $10^4$ to $10^6$ Hz, a current of 10.0 mV, a voltage of ±10 V, and a temperature of 50° C. by electrochemical impedance spectroscopy (EIS), and the mean value of five measurements was obtained.

The material properties of the composite membranes manufactured in the examples and comparative examples were measured, and results thereof are shown in the following Tables 1 and 2 and FIG. 2.

TABLE 1

| Classification | Thickness (μm) | Porosity (%) | Tensile strength ($kgf/cm^2$) | Tensile elongation (%) | Puncture strength (gf) | 105° C. Thermal shrinkage ratio (%) | Ion conductivity (mS/cm) |
|---|---|---|---|---|---|---|---|
| Example 1 | 45 | 65 | 2,391 | 134 | 511 | 1.3 | 0.11 |
| Example 2 | 45 | 75 | 2,292 | 128 | 497 | 2.9 | 0.13 |

TABLE 1-continued

| Classification | Thickness (μm) | Porosity (%) | Tensile strength (kgf/cm²) | Tensile elongation (%) | Puncture strength (gf) | 105° C. Thermal shrinkage ratio (%) | Ion conductivity (mS/cm) |
|---|---|---|---|---|---|---|---|
| Example 3 | 45 | 85 | 2,014 | 111 | 339 | 4.4 | 0.14 |
| Comparative Example 1 | 45 | — | 1,272 | 171 | 103 | 9.2 | 0.16 |

TABLE 2

| Classification | Comparative Example 2 | Example 4 | Example 2 | Example 5 | Comparative Example 3 |
|---|---|---|---|---|---|
| LAGP:PEO | 5:5 | 6:4 | 7:3 | 8:2 | 9:1 |
| Ion conductivity | 0.01 | 0.11 | 0.13 | 0.10 | 0.03 |

Referring to Table 1, it can be seen that the composite membranes of Examples 1 to 3, which were manufactured by impregnating a porous support with a solid electrolyte, exhibited significantly excellent mechanical strength and similar levels of ion conductivity compared to the composite membrane of Comparative Example 1 which was manufactured by forming a solid electrolyte coating.

Figure 2:
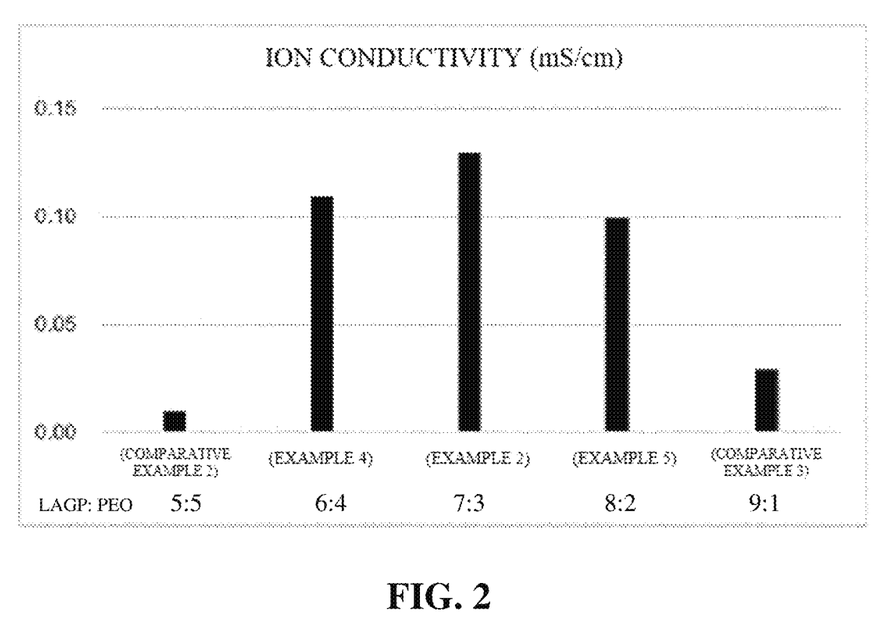
FIG. 2 is a diagram illustrating an experimental result for the ion conductivity of a composite membrane manufactured according to an embodiment of the present invention.

Referring to Table 2 and FIG. 2, it can be seen that when a weight ratio of LAGP and PEO was 6 to 8:2 to 4, the composite membrane exhibited excellent ion conductivity.

As a result of additionally measuring ion conductivity at a high temperature of 60° C. or more, Comparative Example 3 exhibited an ion conductivity of less than 0.1 mS/cm, and Comparative Example 2 and Examples 2, 4, and 5 exhibited ion conductivities of 0.1 to 1 mS/cm.

Experimental Example 2

A penetration test was performed by connecting each of the battery cells manufactured in Preparation Example and Comparative Preparation Examples 1 and 2 to a light emitting diode (LED) and then allowing a nail to penetrate the cell to damage the cell, and the stability of the composite membrane was confirmed.

In the case of the cells of Preparation Example and Comparative Preparation Example 1, the LED emitted light even after the penetration test, but the cell of Comparative Preparation Example 2 was ignited and then exploded.

That is, it can be seen that a conventional battery cell using a liquid electrolyte has a safety problem (e.g., is vulnerable to penetration), but the battery cell using a solid electrolyte has no safety problem because leakage, ignition, explosion, or the like does not occur even when the battery cell is damaged.

The foregoing description of the present invention is intended for illustration, and it will be understood by those skilled in the art to which the present invention pertains that the present invention can be easily modified and implemented in various other forms without changing the technical spirit or essential features of the present invention. Therefore, it should be understood that the embodiments described above are only exemplary in all aspects and not limiting. For example, each of the constituents described as being one combined entity may be implemented separately, and similarly, constituents described as being separate entities may be implemented in a combined form.

It should be understood that the scope of the present invention is defined by the following claims and that all changes or modifications derived from the meaning and scope of the claims and their equivalents are included in the scope of the present invention.

The invention claimed is:

1. A composite membrane comprising:
   a polyolefin-based porous support; and
   a solid electrolyte impregnated into the support,
   wherein the solid electrolyte includes a lithium salt, an inorganic electrolyte, and a polymer,
   wherein a weight ratio of the inorganic electrolyte and the polymer is 6 to 8:2 to 4, and
   wherein a weight ratio of the polymer and the lithium salt is 15~20:1.

2. The composite membrane of claim 1, wherein the solid electrolyte is impregnated into at least a portion of micropores in the polyolefin-based porous support.

3. The composite membrane of claim 1, wherein a surface of the support is at least partially coated with the solid electrolyte.

4. The composite membrane of claim 1, wherein the support includes two types of polyethylene having different weight-average molecular weights at 30 to 90 wt % and an inorganic filler at 10 to 70 wt %.

5. The composite membrane of claim 4, wherein the polyethylene includes first polyethylene having a weight-average molecular weight of 1,000,000 to 3,000,000 and second polyethylene having a weight-average molecular weight of 200,000 to 500,000.

6. The composite membrane of claim 1, wherein the support has a porosity of 50 to 90% and an average pore size of 20 to 100 nm.

7. The composite membrane of claim 1, wherein the inorganic electrolyte is a compound represented by the following Chemical Formula 1 or 2:

Li1+xAlxGe2-x(PO4)3     [Chemical Formula 1]

Li1+xAlxTi2-x(PO4)3     [Chemical Formula 2]

in Chemical Formula 1 or 2, 0≤x≤2.

8. The composite membrane of claim 1, wherein the polymer is one selected from the group consisting of an oxide-based polymer, a nitrile-based polymer, a fluorine-based polymer, an acrylic polymer, a sulfone-based polymer, and a copolymer of two or more thereof.

9. The composite membrane of claim 1, wherein the composite membrane has a thickness of 5 to 100 μm, a tensile strength of 500 to 2,500 kgf/cm2, a tensile elongation of 50 to 300%, and a puncture strength of 100 to 600 gf.

10. A method of manufacturing a composite membrane, comprising the steps of:
    (a) mixing a lithium salt, an inorganic electrolyte, and a polymer in a solvent to prepare an electrolyte solution; and
    (b) filling pores of a porous support with the electrolyte solution;

wherein a weight ratio of the inorganic electrolyte and the polymer is 6 to 8:2 to 4.

* * * * *